(12) United States Patent
Kuhm et al.

(10) Patent No.: US 8,627,553 B2
(45) Date of Patent: Jan. 14, 2014

(54) FASTENING CLIP

(75) Inventors: Michel Kuhm, Ingwiller (FR); Jerome Maurer, Gottenhouse (FR); Susanne Balluch, Eisenberg (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 0 days.

(21) Appl. No.: 13/477,294

(22) Filed: May 22, 2012

(65) Prior Publication Data
US 2013/0133162 A1    May 30, 2013

(30) Foreign Application Priority Data
Jul. 1, 2011    (DE) .......................... 10 2011 106 310

(51) Int. Cl.
*F16B 2/20* (2006.01)
*F16B 19/00* (2006.01)
*F16B 5/06* (2006.01)

(52) U.S. Cl.
USPC .................. 24/458; 24/297; 411/41

(58) Field of Classification Search
USPC .......... 24/297, 453, 458; 411/15, 16, 41, 172, 411/338, 340
See application file for complete search history.

(56) References Cited

U.S. PATENT DOCUMENTS

| | | | | |
|---|---|---|---|---|
| 2,542,144 A | * | 2/1951 | Kearns | 411/41 |
| 2,941,439 A | * | 6/1960 | Rapata | 411/41 |
| 3,352,195 A | * | 11/1967 | Fisher | 411/15 |
| 3,765,295 A | * | 10/1973 | Ptak | 411/41 |
| 4,083,289 A | * | 4/1978 | Erickson | 411/16 |
| 4,222,304 A | * | 9/1980 | Yoshida et al. | 411/34 |
| 4,636,698 A | | 1/1987 | Leclercq | |
| 4,826,378 A | * | 5/1989 | Pamer et al. | 411/338 |
| 4,890,966 A | * | 1/1990 | Umezawa | 411/340 |
| 5,093,965 A | * | 3/1992 | Mauras et al. | 24/114.2 |
| 6,376,824 B1 | | 4/2002 | Michenfelder et al. | |
| 7,188,393 B2 | * | 3/2007 | Kawai | 24/297 |
| 7,966,702 B2 | * | 6/2011 | Horimatsu et al. | 24/297 |
| 2004/0041373 A1 | * | 3/2004 | Helmstetter et al. | 280/728.2 |
| 2007/0235638 A1 | | 10/2007 | Backes et al. | |
| 2009/0249923 A1 | * | 10/2009 | Seidel | 81/61 |
| 2011/0113598 A1 | * | 5/2011 | Hofmann et al. | 24/458 |

FOREIGN PATENT DOCUMENTS

| | | | | |
|---|---|---|---|---|
| DE | 2754910 | | 6/1979 | |
| DE | 2754910 A1 | * | 6/1979 | ............. F16B 13/04 |
| DE | 102005051243 | | 5/2007 | |
| DE | 102005051243 A1 | * | 5/2007 | ............. F16B 23/00 |

(Continued)

*Primary Examiner* — Robert J Sandy
*Assistant Examiner* — Louis Mercado
(74) *Attorney, Agent, or Firm* — Tarolli, Sundheim, Covell & Tummino LLP

(57) ABSTRACT

A fastening clip for fastening a component to a carrier, has a holding member, the holding member being adapted to be inserted into an opening of the carrier in an insertion direction and the holding member includes a plurality of expansion arms adapted to engage behind the opening of the carrier, and an expansion member adapted to be inserted into a recess of the holding member contrary to the insertion direction so that the expansion arms are transferred from an initial position to an expanded position, wherein the holding member and the expansion member are integrally connected with each other in a preassembly position by connecting webs which each constitute a predetermined breaking point and which are provided in particular between the front end of the holding member viewed in the insertion direction and the rear end of the expansion member viewed in the insertion direction.

9 Claims, 4 Drawing Sheets

(56) References Cited

FOREIGN PATENT DOCUMENTS

| DE | 102007016484 | | 10/2008 | | |
| DE | 102007016484 | A1 * | 10/2008 | ................ | F16B 5/06 |
| DE | 102008017451 | | 10/2009 | | |
| DE | 102008017451 | B4 * | 10/2009 | ................ | F16B 5/06 |
| DE | 202010008192 | | 11/2010 | | |
| DE | 202010008192 | U1 * | 11/2010 | ................ | F16B 5/06 |
| WO | WO 2007048531 | A1 * | 5/2007 | .............. | B25B 13/48 |
| WO | 2012013592 | | 2/2012 | | |
| WO | WO 2012013592 | A1 * | 2/2012 | .............. | F16B 21/07 |

* cited by examiner

FASTENING CLIP

TECHNICAL FIELD

The present invention relates to a fastening clip for fastening a component to a carrier, including a holding member that is adapted to be inserted into an opening of the carrier in an insertion direction and that has a plurality of expansion arms adapted to engage behind the opening of the component, and including an expansion member adapted to be inserted into a recess of the holding member contrary to the insertion direction, so that the expansion arms are transferred from an initial position to an expanded position.

BACKGROUND OF THE INVENTION

Various two-part fastening clips for fastening a component to a carrier are known from the prior art. These fastening clips consist, for example, of a holding member that can be fitted into an opening of a carrier for fixing the component to the carrier, and of an expansion member that can be inserted into the holding member for expanding the holding member and thereby fixing it in place on the carrier. To this end, expansion arms are provided on the holding member which are adapted to engage behind the opening of the component. The expansion member is configured such that it can shift the expansion arms into an expanded position, in which the expansion arms can engage in the component. In the process, the expansion member is pulled into the holding member contrary to the insertion direction, so that the expansion member does not project forward beyond the holding member in any assembly position, and an assembly of the fastening clip substantially flush with the surface of the carrier is possible. But during assembly or transportation of the fastening clip, individual parts of such a fastening clip may be lost. In addition, the expansion member needs to be positioned at the holding member before or after assembly of the latter.

The object of the invention is to provide a fastening clip which is simpler to assemble and which reliably prevents individual parts from becoming lost during transportation and assembly. Furthermore, the fastening clip according to the invention is intended to be simpler to manufacture.

BRIEF SUMMARY OF THE INVENTION

According to the invention a fastening clip for fastening a component to a carrier, has a holding member, the holding member being adapted to be inserted into an opening of the carrier in an insertion direction and the holding member includes a plurality of expansion arms adapted to engage behind the opening of the carrier, and an expansion member adapted to be inserted into a recess of the holding member contrary to the insertion direction so that the expansion arms are transferred from an initial position to an expanded position, wherein the holding member and the expansion member are integrally connected with each other in a preassembly position by connecting webs which each constitute a predetermined breaking point and which are provided in particular between the front end of the holding member viewed in the insertion direction and the rear end of the expansion member viewed in the insertion direction. Accordingly, in the preassembly condition the fastening clip is of a one-piece design, the holding member and the expansion member being arranged, as it were, one behind the other in the insertion direction and connected with each other by means of the connecting webs. The fastening clip may be fitted as a unit into the opening of the carrier in the insertion direction. Subsequently, the expansion member is pulled into the recess of the holding member contrary to the insertion direction, the connecting webs configured as predetermined breaking points breaking in the process and, thus, a movement of the expansion member relative to the holding member being allowed. Since the members of the fastening clip are integrally connected with each other, a simpler assembly is possible since no later positioning of the expansion member at the holding member is required. As a result, the expansion member can not fall out of the holding member. In addition, the fastening clip can be manufactured in one piece in an injection molding process, as a result of which the manufacturing expense is reduced.

Preferably, corresponding detent members are provided on the holding member and on the expansion member for fixing the expansion member in place on the holding member in an intermediate assembly position, in which the predetermined breaking point has been broken and the expansion member partially inserted into the holding member, but the expansion arms are in the initial position. During assembly of the fastening clip, the expansion member is partly inserted into the holding member after the breaking of the predetermined breaking points, until the corresponding detent members lock onto each other. But in this intermediate position the expansion arms of the holding member are not yet moved outwards to the expanded position, so that the fastening clip can still be moved. This allows, for example, a later change in position or even a disassembly of the fastening clip, it being ensured each time that the expansion member can not be lost.

In this embodiment the expansion member further needs to be displaceable in relation to the detent member contrary to the insertion direction, for the expansion member to be able to transfer the expansion arms of the holding member to an expanded position. To allow this, the detent connection is formed, for example, by a detent hook and an oblong recess in which the detent hook can be shifted in the insertion direction, so that the expansion member can be shifted from the intermediate assembly position to the final assembly position without releasing the detent connection. Thus, the expansion member and the holding member are captively connected with each other, but movable relative to each other.

To insert the expansion member into the holding member contrary to the insertion direction, provision may be made, for example, for a pulling means, in particular a screw, which engages the expansion member and is adapted to pull the latter into the holding member contrary to the insertion direction. Usually, the fastening clip is inserted into a carrier in such a way that it is not accessible from the rear side of the carrier. A pulling means allows the expansion member to be shifted even in such an installation condition in which a direct access to the expansion member is not possible.

Prior to the expansion of the expansion arms, the fastening clip typically has a certain clearance in the opening, which makes a tightening of the pulling means but also an exact positioning more difficult. In addition, the fastening clip may fall out of the opening. In order to fix the holding member in place in the opening of the carrier prior to the engagement of the expansion arms, detent tongues may be provided for example on the outside of the holding member, the detent tongues being adapted to engage in the opening of the carrier. They may allow a preliminary fixing of the holding member in place, whereby a sufficiently high retention force is provided, so that the holding member, that is, the fastening clip, can not fall out of the opening. The full retention force required for holding the carrier is provided only subsequently by an expansion of the expansion arms.

The detent tongues are provided located opposite each other in pairs, for example, so that the holding member is centrally centered in the opening. In addition, a plurality of detent tongues may be provided which are spaced from each other in the insertion direction, allowing a sufficient preliminary fixing even in case of different thicknesses of the carrier.

To prevent the holding member or the fastening clip from rotating, the holding member is preferably of a rectangular design and the detent tongues are provided on opposite side surfaces.

In this embodiment, the expansion arms are provided on the two remaining surfaces of the holding member, for example, that is, each offset by 90° relative to the detent tongues.

The expansion member may have insertion slopes, for example, which press the expansion arms radially outwards.

DETAILED DESCRIPTION OF THE PREFERRED EMBODIMENTS

Figure 1:
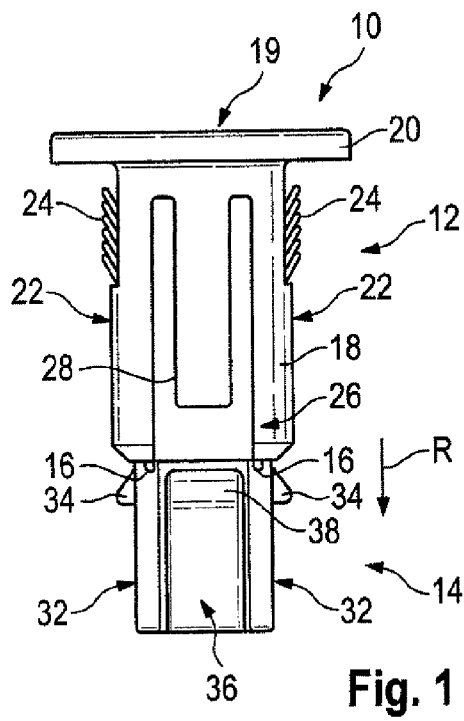
FIG. 1 shows a first side view of a fastening clip according to the invention.
Figure 2:
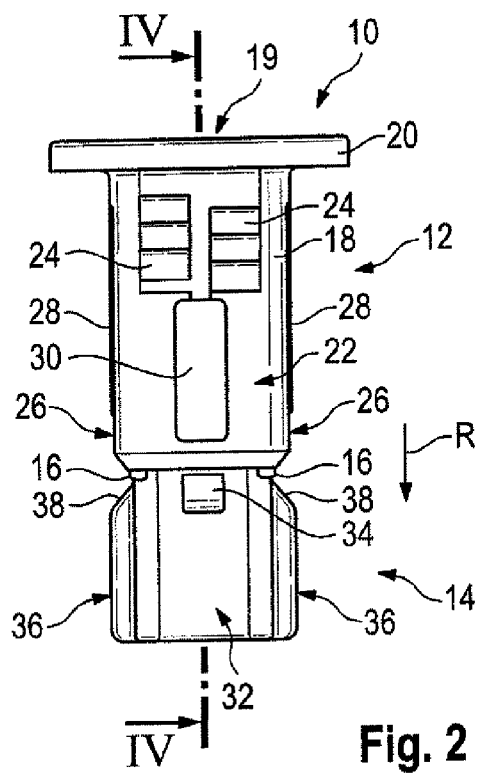
FIG. 2 shows a second side view of the fastening clip from FIG. 1.
Figure 3:
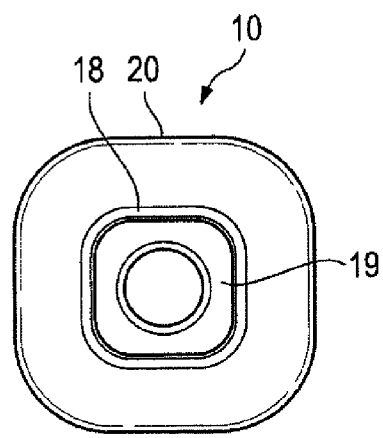
FIG. 3 shows a top view onto the fastening clip from FIG. 1.
Figure 4:
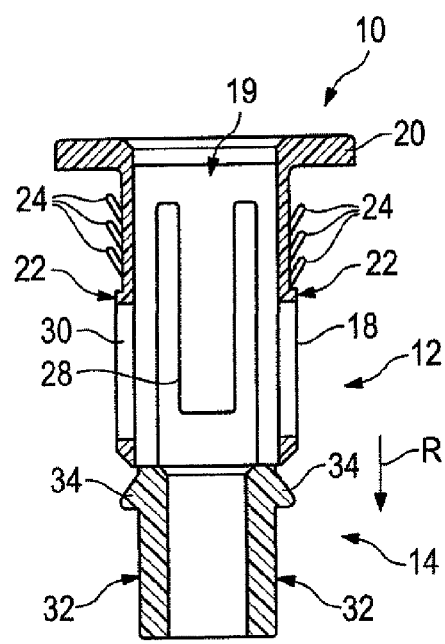
FIG. 4 shows a sectional view of the fastening clip taken along the plane IV-IV from FIG. 2.
Figure 5:
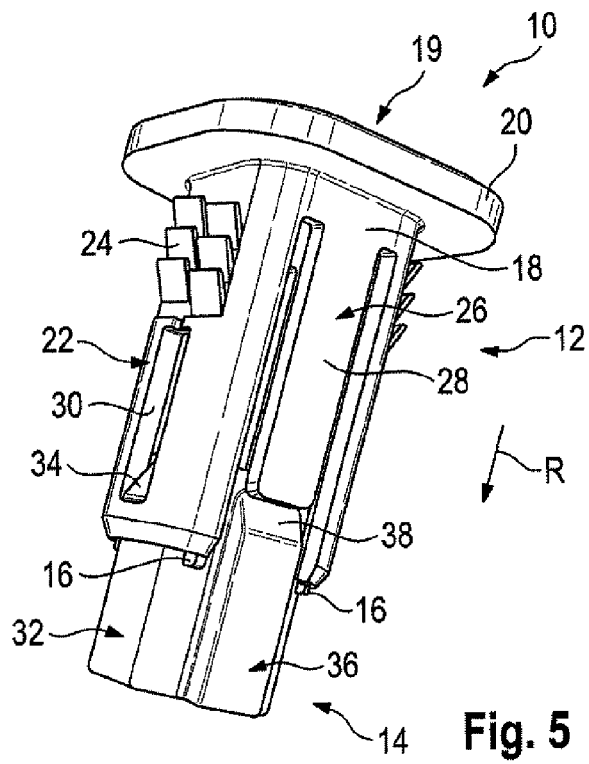
FIG. 5 shows a first perspective view of the fastening clip from FIG. 1 in an intermediate assembly position of the expansion member.
Figure 6:
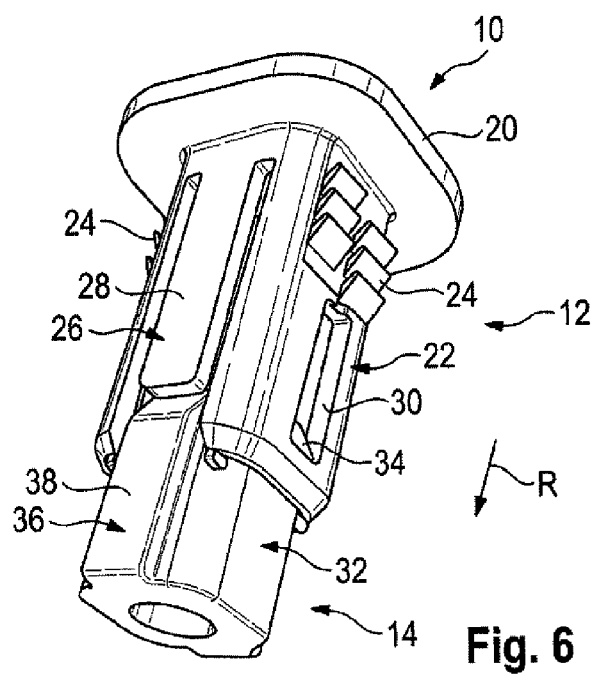
FIG. 6 shows a second perspective view of the fastening clip of FIG. 5.

FIGS. 1 to 4 illustrate a fastening clip 10 for fastening a component to a carrier, for example a lining part to a vehicle body, which can be inserted into a carrier in an insertion direction R. The fastening clip has a holding member 12 and an expansion member 14, which are connected with each other by means of connecting webs 16 in the preassembly position illustrated in FIGS. 1 to 4.

The holding member 12 has an oblong base body 18 having a recess 19 that is continuous in the insertion direction R and a flange 20 that is arranged at the rear end of the holding member 12 viewed in the insertion direction. The base body 18 has a substantially rectangular cross-section (see FIG. 3).

The base body 18 has two opposite side surfaces 22 (see FIG. 1) each having a plurality of detent tongues 24 provided thereon, which are arranged on the side surfaces 22 one behind the other in an insertion direction R of the fastening clip 10, that is, each pair of detent tongues has a different distance from the flange 20 of the holding member 12. Formed on each of the two remaining side surfaces 26 (see FIG. 2) of the base body 18, that is, offset by 90° in relation to the detent tongues 24 in cross-section, is one respective expansion arm 28, which here is in the form of a leaf spring which is connected with the base body 18 at the rear end of the holding member 12 viewed in the insertion direction R. Further provided on the first side surfaces 22 of the holding member 12 are oblong recesses 30 which are provided in front of the detent tongues 24 viewed in the insertion direction R.

The expansion member 14 also has a substantially rectangular cross-section, the cross-section of the expansion member 14 being configured such that the expansion member 14 can be inserted into the recess 19 of the holding member 12 contrary to the insertion direction R. Detent hooks 34 are provided on two oppositely located first side surfaces 32 of the expansion member 14 which correspond to the first side surfaces 22 of the holding member 12, the detent hooks 34 being adapted to latch into the oblong recesses 30 on the base body 18 of the holding member 12, as will be discussed below. The second side surfaces 36 have insertion slopes 38 provided thereon which can cooperate with the expansion arms 28 of the holding member 12 and can move them radially outwards to an expanded position.

Further provided in the recess 19 is a pulling means, not shown here, in particular a screw. The screw is rotatably mounted at the flange 20 of the holding member 12; a tool can be inserted into the recess 19 in the insertion direction R to turn the screw. The thread of the screw engages the expansion member 14, so that the expansion member 14 can be pulled into the recess 19 of the holding member 12 contrary to the insertion direction R by turning the screw.

FIGS. 1 to 4 show the fastening clip in a preassembly position, in which the holding member 12 and the expansion member 14 are integrally connected with each other by means of the connecting webs 16. As can be seen in particular in FIGS. 1 and 2, the connecting webs 16 are provided at the front end of the holding member 12 in the insertion direction R and at the rear end of the expansion member 14 in the insertion direction R, so that the holding member 12 and the expansion member 14 are held one behind the other, as it were, by the connecting webs 16 in the insertion direction R.

Figure 7:
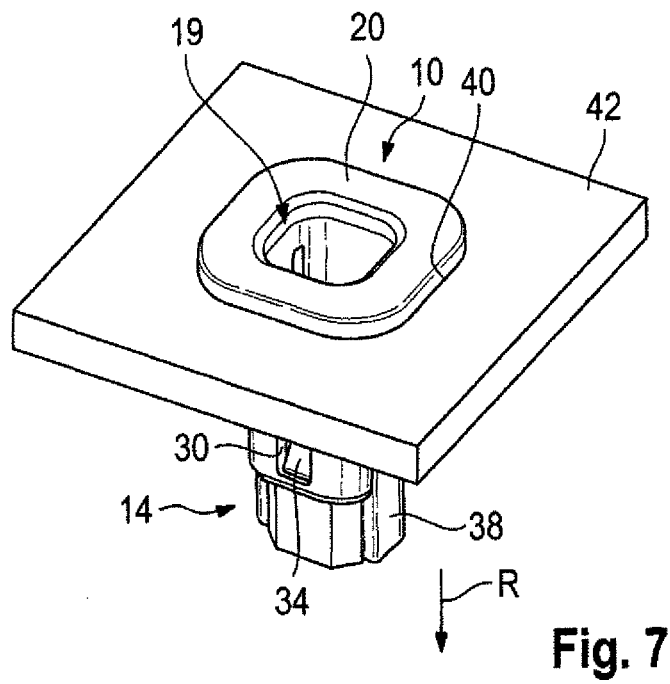
FIG. 7 shows the fastening clip from FIG. 5 in the inserted condition in a carrier.

In this preassembly position, the fastening clip 10 can be inserted into an opening 40 of a component 42 (see FIGS. 7 and 8), and this component 42 can subsequently be fastened to a carrier 44. To this end, the fastening clip 10 is passed through an opening 46 of the carrier 44. Then, the expansion arms 28 are expanded, whereby the fastening clip 10 is fixed in place at the carrier 44 and, thus, the component 42 is pressed against the carrier 44 (see FIGS. 9 and 10).

After the insertion of the fastening clip 10 into the component 42 and the carrier 44, the expansion member 14 is pulled into the recess 19 of the holding member 12 by the pulling means contrary to the insertion direction R. The tensile force acting on the expansion member 14 causes the connecting webs 16 that serve as predetermined breaking points to be severed, so that the expansion member 14 is shiftable relative to the holding member 12. Subsequently, the expansion member 14 is pulled into the recess 19 of the holding member 12 until the detent hooks 34 engage into the oblong recesses 30 on the base body 18 of the holding member 12.

This intermediate assembly position is illustrated in FIGS. 5 to 8. In this intermediate assembly position, the expansion member 14 is movable in relation to the holding member 12 contrary to the insertion direction R, the displacement path being limited by the oblong recess 30. In this intermediate assembly position, the insertion slopes 38 of the expansion member 14 already rest against the expansion arms 28 but do not exert a force thereon, so that the expansion arms continue to be in the initial position, in which the expansion arms 28 do not project beyond the base body 18 of the holding member 12.

It is also possible for the expansion member 14 to be transferred to the intermediate assembly position prior to fitting the fastening clip 10 into the opening 40 of the component 42, for instance in order to simplify the rupture of the predetermined breaking points in this way. Since the components are captively connected with each other also in the intermediate assembly position by the detent connection formed by the detent hook 34 and the oblong recess 30, a simple insertion is ensured in this way as well, without the risk of parts becoming lost.

Figure 8:
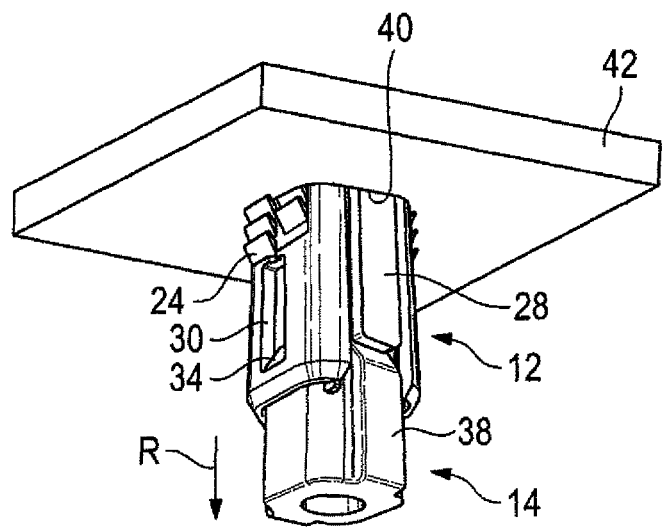
FIG. 8 shows a second view of the fastening clip from FIG. 7.

As can be seen in particular in FIG. 8, the fastening clip is preliminarily fixed in the intermediate assembly position in the opening 40 of the component 42 by the detent tongues 24, so that the detent tongues 24 prevent the fastening clip from slipping out or shifting its position. But the detent tongues 24 merely serve to fix the fastening clip 10 in place during assembly and are not able to exert a holding force sufficient to fix the component 42 in position at the carrier 44.

With a plurality of detent tongues 24 spaced apart in the insertion direction R being provided on the holding member 12, the fastening clip 10 is reliably fixed in place by them even in the case of different component thicknesses.

Figure 9:
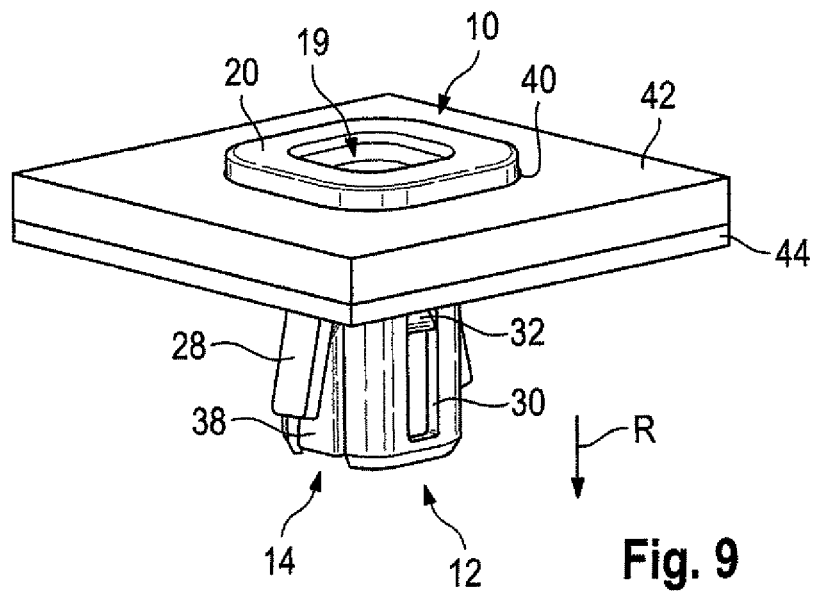
FIG. 9 shows the fastening clip from FIG. 1 in a final assembly condition of the expansion member.
Figure 10:
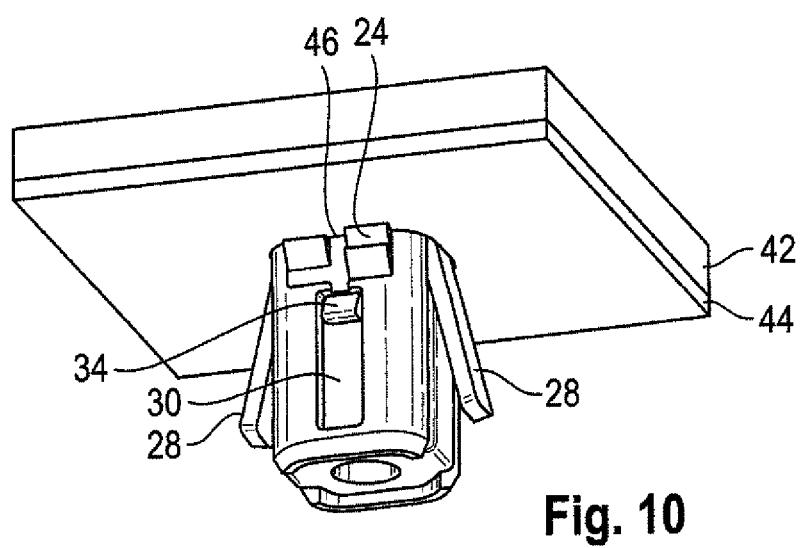
FIG. 10 shows a second view of the fastening clip from FIG. 9.

The final fixing in position is effected in a next assembly step in which, starting from the intermediate assembly position, the expansion member 14 is pulled further into the recess 19 of the holding member 12 (FIGS. 9 and 10). In the process, the insertion slopes 38 urge the expansion arms 28 radially outwards, so that the expansion arms 28 are spread apart on the rear side of the carrier 44 and thereby fix the fastening clip 10 and thus the component 42 in place at the carrier 44.

The rectangular shape of the fastening clip 10 ensures that the holding member 12 is prevented from co-rotating when the screw is turned in order to pull the expansion member 14 into the holding member 12. But it is also conceivable that the fastening clip 10 has a different cross-sectional shape that reliably prevents the fastening clip 10 from co-rotating. It is also conceivable, in particular with round cross-sections, to make provision for additional elements on the outer circumference of the base body 18 that prevent such co-rotation.

The invention claimed is:

1. A fastening clip for fastening a component to a carrier, comprising a holding member, the holding member being adapted to be inserted into an opening of the carrier in an insertion direction and the holding member includes a plurality of expansion arms adapted to engage behind the opening of the carrier, and comprising an expansion member adapted to be inserted into a recess of the holding member contrary to the insertion direction, so that the expansion arms are transferred from an initial position to an expanded position, wherein the holding member and the expansion member are integrally connected with each other in a preassembly position by connecting webs which each constitute a predetermined breaking point and which are provided in particular between a front end of the holding member viewed in the insertion direction and a rear end of the expansion member viewed in the insertion direction.

2. The fastening clip according to claim 1, wherein corresponding detent members are provided on the holding member and on the expansion member for fixing the expansion member in place on the holding member in an intermediate assembly position, in which each predetermined breaking point has been broken and the expansion member partially inserted into the holding member, but the expansion arms are in the initial position.

3. The fastening clip according to claim 2, wherein a detent connection is formed by a detent hook and an oblong recess in which the detent hook can be shifted in the insertion direction, so that the expansion member can be shifted from the intermediate assembly position to a final assembly position without releasing the detent connection.

4. The fastening clip according to claim 1, wherein provided on the holding member is a pulling means, in particular a screw, which engages the expansion member and is adapted to pull the expansion member into the holding member contrary to the insertion direction.

5. The fastening clip according to claim 1, wherein provided on an outside of the holding member are detent tongues which are adapted to engage in the opening of the carrier.

6. The fastening clip according to claim 5, wherein a plurality of detent tongues is provided, each located opposite each other in pairs and spaced apart from each other in the insertion direction.

7. The fastening clip according to claim 1, wherein the holding member is of a rectangular design and detent tongues are provided on opposite side surfaces.

8. The fastening clip according to claim 7, wherein the expansion arms are provided on two remaining surfaces of the holding member.

9. The fastening clip according to claim 1, characterized in that the expansion member has insertion slopes which press the expansion arms radially outwards.

* * * * *